United States Patent [19]

Suzuki

[11] Patent Number: 4,865,385
[45] Date of Patent: Sep. 12, 1989

[54] RECLINING DEVICE FOR BUCKET SEAT

[76] Inventor: Hiroshi Suzuki, c/o Tachi-S Co., Ltd., 2-12 Matsubaracho 3-chome, Akishima-shi, Tokyo, Japan

[21] Appl. No.: 216,171

[22] Filed: Jul. 7, 1988

[51] Int. Cl.⁴ .............................................. B60N 6/02
[52] U.S. Cl. ..................................... 297/362; 297/229
[58] Field of Search ......................... 297/361, 362, 229

[56] References Cited

U.S. PATENT DOCUMENTS

| | | | |
|---|---|---|---|
| 1,543,612 | 6/1925 | Pascaud | 297/417 |
| 2,016,119 | 10/1935 | Owler et al. | 297/362 |
| 3,583,762 | 6/1971 | Strien | 297/361 |
| 3,749,443 | 7/1973 | Strien et al. | 297/362 |
| 3,774,964 | 11/1973 | Turner | 297/361 |
| 4,470,633 | 9/1984 | Fourrey et al. | 297/362 |

FOREIGN PATENT DOCUMENTS 2017810 10/1979 United Kingdom ................ 297/362

Primary Examiner—Francis K. Zugel

[57] ABSTRACT

A reclining device for a bucket seat or full bucket seat, in which a rotation rod is extended between the seat cushion frame and seat back frame associated with the seat, and one end of the rotation rod is threadly engaged with a female screw member provided at the seat back frame, whereas the other end thereof is operatively connected via an orthogonal transmission mechanism with an operation knob provided at the seat cushion frame. The rotation of the operation knob cuases the movement of the female screw member which in turn causes the forward and backward inclination of the seat back frame relative to the seat cushion frame in an fine adjustable manner.

6 Claims, 2 Drawing Sheets

RECLINING DEVICE FOR BUCKET SEAT

BACKGROUND OF THE INVENTION

1. Field of the Invention

The present invention relates to a reclining device used in an automotive seat, and particularly relates to a reclining device used in a bucket seat or full bucket seat, which is capable of fine adjustments of seat back relative to the seat cushions.

2. Description of the Prior Art

A bucket set is generally known as having a deep support effect in the sense that its great seating depth and raised side support portions stably support an occupant thereon as if he or she were embraced on both sides. In particular, a full bucket seat, in which its seat cushion and seat back are continuously formed together, improves such deep support effect far more, because the seating depth and raised side support portions are provided in both seat and back cushions, thus giving a higher support effect than the simple bucket seat.

Such full bucket seat has, ever since, had an attendent technical problem in terms of its adjustability of the seat back inclination. The integral, continuous formation of its seat back and seat cushion has been a bar impeding the provision of a general reclining device therein and it has been considered practically impossible to adjust the inclination of the seat back in the full bucket seat.

Further, there has been no proposal for a small, simple fine-adjustment-type reclining device that can be installed within the full bucket seat.

Hitherto reclining devices are generally directed to adjustment or fine adjustment of inclination of an independent seat back, as is known, for example, from the Japanese Laid-Open Utility Model Publication No. 60-112941. However, its body on the whole is exposed externally of the seat, presenting an objectionable aspect in the aesthetic appearance of the seat, and its structure is rather complicated, requiring a large number of parts and resulting in a time-consuming assembling process and labor.

SUMMARY OF THE INVENTION

With a view to obviating the above-mentioned problems, it is therefore a purpose of the present invention to provide a reclining device for a bucket seat or full bucket seat, which is simple in structure, and permits a fine adjustment of inclination of the seat back in a stepless manner without the external exposure of its body.

In achievement of such purpose, the present invention is made, with in mind the pivot point in the seat frame structure of a full bucket seat, wherein a seat back frame is pivotally, rotatably connected to a seat cushion frame. Hence, in accordance with the invention, a holder member is provided at the seat cushion frame side forwardly of such pivot point and a female screw member is provided at the seat back frame side above the pivot point. Between those holder member and female screw member, there extends a rotation rod in such a manner that its one end is rotatably connected with an orthogonal transmission mechanism, such as an orthogonal bevel gear mechanism, equipped in the holder, and the other end is formed with a male screw member which is threadedly engaged with the female screw member. An operation knob is connected with the orthogonal transmission mechanism.

Accordingly, when the operation knob is rotated, the rotation rod is caused, via the orthogonal transmission mechanism, to rotate, which in turn causes the movement of the female screw member along the longitudinal direction of the male screw member or the rotation rod. Thus, the movement of the female screw member produces a stepless inclination of the seat back frame relative to the seat cushion frame in an adjustable manner.

It is then appreciated that the rotation rod is disposed within the seat cushion and seat back of the seat and all other elements are also disposed within the seat, whereby the body of the reclining device is not exposed externally of the seat, contributing to the aesthetic effect of the same.

In another aspect of the invention, a truss structure is defined around the pivot point of the seat by virtue of a triangle-like interconnection among the rotation rod, seat back frame and seat cushion frame, which assures a far increased robust and rigid structure of the seat frame.

DETAILED DESCRIPTION OF PREFERRED EMBODIMENT OF THE INVENTION

Figure 1:
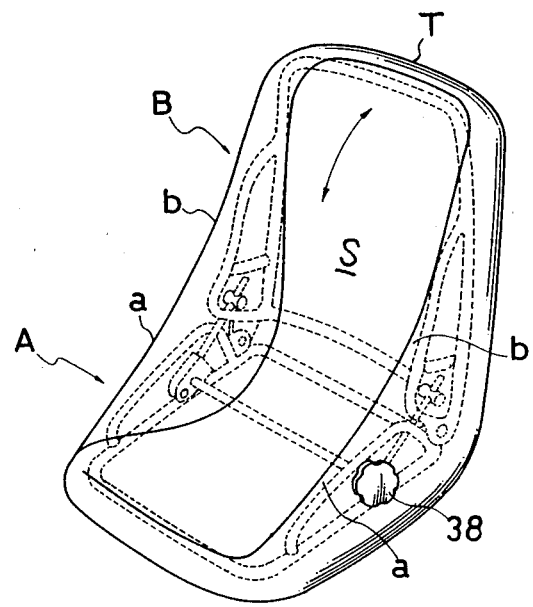
FIG. 1 is a perspective view of a full bucket seat in which provided is a reclining device in accordance with the present invention.

With reference to FIG. 1, there is illustrated a full bucket seat (S) which comprises a seat cushion (A) and seat back (B), with a pair of raised side support portions (a)(a) being integrally formed on the respective sides of the seat cushion (A) and another pair of raised side support portions (b)(b) being integrally formed on the respective sides of the seat back (B). As can be seen, the seat back (B) is integrally formed with the seat cushion (A), but the former is inclinable forwardly and backwardly relative to the latter as shown in the direction of the arrow, and for that purpose, a top covering surface (T), which covers the outer surfaces of the seat cushion (A) and seat back (B) in a unitary, integral fashion, is formed in a loose state, or may be formed of a stretchable material, allowing for the range of inclination of the seat back (B) relative to the seat cushion (A), so that the seat back (B) may be smoothly and easily inclined.

Within the above-mentioned full bucket seat, a reclining device is installed in accordance with the present invention, which will be specifically described as below.

Figure 2:
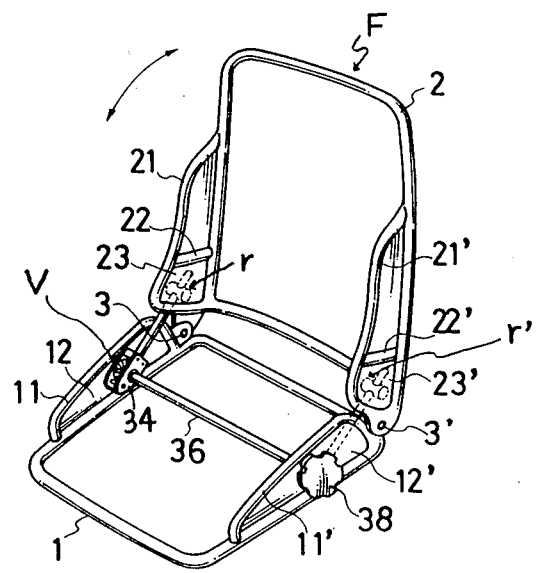
FIG. 2 is a perspective view of a seat frame of the full bucket seat, showing clearly the provision of the reclining device of the invention therein.

Referring now to FIG. 2, there is shown a seat frame (F) in the full bucket seat, which comprises a seat cushion frame (1) and a set back frame (2), both of them being made of a pipe material and formed in a substantially square shape. Those two frames are connected with each other such that the former frame (1) is rotatable about two pivot points (3)(3′).

Designations (11)(11') denote a pair of first side frames each being of a generally inverted-U-shaped configuration and welded to the respective upper surfaces of the lateral bar sections of the seat cushion frame (1) in a manner standing upwardly therefrom.

Designations (21)(21') denote a pair of second side frames each being likewise of a generally inverted-U-shaped configuration and welded to the respective upper surfaces of the lateral bar sections of the seat back frame (2) in a manner projecting forwardly of the seat back frame (2).

Both first and second side frames (11)(11')(21)(21') are made of a pipe material as same with the seat cushion frame (1) and seat cushion frame (2).

A pair of reinforcing support rods (22)(22') are respectively arranged on the lateral sides of the seat back frame (2) such that one support rod (22) extends between the upper bar section of the one second side frame (21) and one lateral bar section of the seat back frame (2) whereas the other support rod (22') extends likewise between the upper bar section of the other second side frame (21') and other lateral bar section of the seat back frame (2), as shown in FIG. 2.

It is noted that the aforementioned raised side portions (a)(a)(b)(b) of the seat (S) are therefore defined by the presence of those first and second side frames (11)(11')(21)(21').

At both lateral bar sections of the seat cushion frame (1), a pair of side attachment plates (12)(12') are fixedly provided respectively, such that one attachment plate (12) spreads over the space defined between the one first side frame (11) and one lateral bar section of the seat cushion frame (1) whereas the other attachment plate (12') spreads over the space defined between the other first side frame (11'), as illustrated.

A pair of dual-plate attachments (23)(23') are arranged at the side of the seat back frame (2) in such a manner that one dual-plate attachment (23) spreads over the space (r) circumscribed by the one reinforcing support rod (22), the lower part of the one lateral bar section of the seat back frame (2), and the lower curved part of the one second side frame (21), while the other dual-plate attachment (23') spreads over the space (r') circumscribed by the other reinforcing support rod (22'), the lower part of the other lateral bar section of the seat back frame (2), and the lower curved part of the other second side frame (21'), as illustrated.

Here, a specific description will be given by referring to FIG. 5, only for the one dual-plate attachment (23) as below, because the other attachment plate (23') is of the same construction and the description thereon is omitted.

Figure 5:
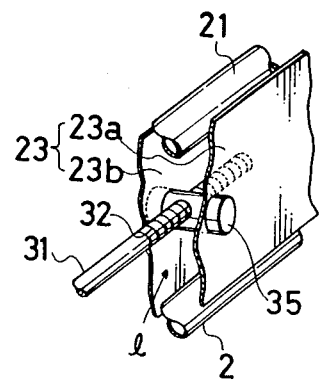
FIG. 5 is a partially broken perspective view of one lateral portion of a seat back frame.

As seen in FIG. 5, the dual-plate attachment (23), as the term implies, is formed by such dual plate structure as a pair of first and second spaced-apart plate members (23a)(23b). The first plate member (23a) is welded to the corresponding inner sides of the above-mentioned reinforcing support rod (22), lower part of the lateral bar section of the seat back frame (2) and lower curved part of the second side frame (21). The second plate member (23b) is, on the other hand, welded to the corresponding outer sides of those three elements. Thus, it is seen that the first and second plate members (23a)(23b) are disposed in an opposed, spaced-apart relation with each other with respect to the reinforcing support rod (22), lower part of the lateral bar section of the seat back frame (2) and lower curved part of the second side frame (21), representing a dual-plate structure having a hollow portion (l) defined therein.

Figure 3:
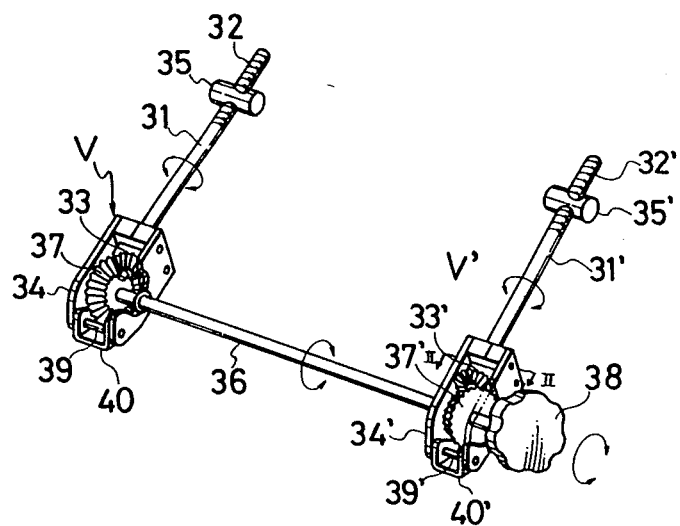
FIG. 3 is a perspective view which shows a principal portion of the present invention.

FIG. 3 shows a whole structure of reclining device which is incorporated in the above-described seat frame (F).

According to the illustrated reclining device, there are provided a pair of first and second holders (34)(34'), a connecting rod (36) rotatably extended between those two holders (34)(34'), the connecting rod (36) being provided with an operation knob (38) at the side of the second holder (34'), and a pair of rotation rods (31)(31') each being operatively connected with the respective end portions of the connecting rod (36) via a pair of first and second orthogonal transmission mechanisms (V)(V') arranged respectively within the first and second holders (34)(34').

On the respective end portions of the rotation rods (31)(31'), a pair of male screw members (32)(32') are integrally formed which are in a threaded engagement with a pair of female screw members (35)(35'), respectively.

Specifically, the connecting rod (36) is at its both ends rotatably journaled between the side attachment plates (12)(12'), and the first and second holders (34)(34') are mounted inwardly of the side attachment plates (12)(12') on the respective lateral bar sections of the seat cushion frame (1) such that the lower end portions of the holders (34)(34') are respectively supported pivotally on a pair of generally U-shaped brackets (40)(40') by means of pins (39)(39') provided in the brackets (40)(40') so that the holders (34)(34') are rotatable upwards and downwards about the respective pins (39)(39'). The brackets (40)(40') are respectively welded on the lateral bar sections of the seat cushion frame (1). Accordingly, although not illustrated, an arcuate guide hole is perforated in each of the side attachment plates (12)(12') so that both ends of the connecting rod (36) are slidingly moveable along the arcuate guide holes in coordination with the vertical rotation of the brackets (40)(40').

At the respective upper end portions of the holders (34)(34'), there extend therefrom the foregoing rotation rods (31)(31') at a right angle relative to the connecting rod (36).

It is seen that the rotation rods (31)(31') extend from the first side frames (11)(11') up to the second side frames (21)(21') in an oblique manner.

Figure 4:
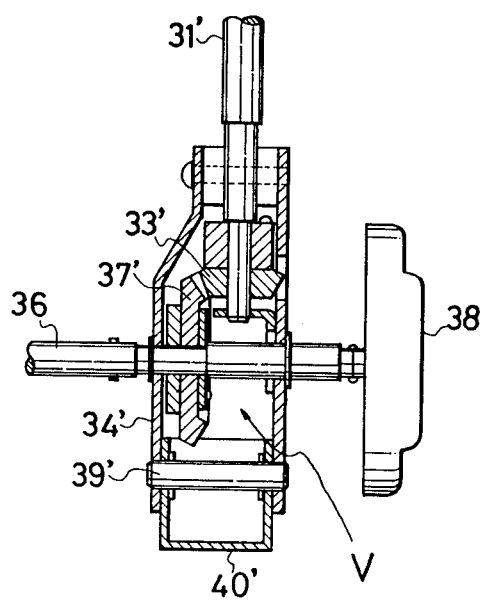
FIG. 4 is a sectional view taken along the line II—II in the FIG. 3, showing an orthogonal transmission mechanism provided in the present invention.

The first and second orthogonal transmission mechanisms (V)(V') are adapted for transmitting a rotational input force caused at the horizontally disposed connecting rod (36) to the vertically disposed rotation rods (31)(31'), and in the illustrated embodiment, the former (V) comprises a first bevel gear (37) and a second bevel gear (33), whereas the latter (V') likewise comprises another set of first and second bevel gears (37')(33'). As best shown in FIG. 4, the first bevel gear (37') is fixed on the end portion of the connecting rod (36) at side of the operation knob (38), and the second bevel gear (33') is fixed on the lower end of the rotation rod (31') which is rotatably supported in the second holder (34), such that the first and second bevel gears (37')(33') are engaged with each other in an orthogonal relation. This description is given only for the second orthogonal transmission mechanism (V'), but the same goes for the first orthogonal transmission mechanism (V) except for the operation knob (38).

The female screw members (35)(35'), as seen in FIG. 2, are respectively disposed in the spaces (r)(r') at the seat back frame (2). As for the female screw member (35'), referring to FIG. 5, it is formed like a cylindrical rod, having an internally threaded hole perforated centrally thereof, in which partially engaged is the mating externally threaded surface of the male screw member (31) which is also of a cylindrical shape. The thus-formed female screw member (35') is provided in the hollow portion (l) in the dual-plate attachment (23), extending transversely thereof, such that its both ends are rotatably secured at the respective first and second plate members (23a)(23b). Description is omitted for the other female screw member (35) because of the same structure.

In this context, it should be noted that the externally threaded surfaces of the male screw members (31)(31') are formed at a proper length lest the free ends of the male screw members (31)(31') should contact any of the surrounding frame parts (2, 21, 21', 22, 22') which circumscribe the spaces (r)(r') during the movement of the female screw members (35)(35') along the respective external surfaces of the male screw members (31)(31'), so as to allow the seat back frame (2) to be smoothly adjusted its inclination without interference of those free ends of the male screw members (35)(35').

With the above-described construction, when the operation knob (38) is rotated, the connecting rod (36) is caused to rotate simultaneously, which in turn causes the rotation of the first bevel gears (37)(37') and thus the simultaneous rotation of the second bevel gears (33)(33'). In response to such gear movement, the rotation rods (31)(31') and male screw members (32)(32') are caused to rotate, whereupon the female screw members (35)(35'), which are respectively threadedly engaged with the male screw members (32)(32'), are then moved along the longitudinal axial direction of the latter screw members (32)(32'). Accordingly, such movement of the female screw members (35)(35') causes the forward and backward rotation of the seat back frame (2) about the pivot points (3)(3'), so that the inclination angle of the seat back frame (2) is adjustable in a stepless way relative to the seat cushion frame (1) by the rotation of the operation nob (38).

While having described before, the present invention is not limited to the illustrated embodiment, but various other modifications, replacements or additions may structurally be possible without departing from the spirit and scopes of the appended claims for the invention.

From the above descriptions, it is appreciated that all parts of the reclining device in accordance with the present invention are not only extremely simply assembled, but also made of a rather small, thin materials, and can be installed within the thin inner structure of bucket seat or full bucket seat, which avoids the external exposure of those parts and therefore prevents impairment of aesthetic appearance of the seat. Further, it is important to note that the rotation rods (31)(31'), lower part of the seat back frame (2), and rearward part of the seat cushion frame (1) cooperate to define a triangle structure, thus providing a truss effect of the rotation rods (31)(31') between the seat back frame (2) and the cushion frame (1), with result that the rigidity of the seat is highly increased.

What is claimed is:

1. A reclining device for a bucket seat, in which said bucket seat comprises a seat cushion frame and a seat back frame, both of them being rotatably connected to each other at a pivot point to permit forward and backward rotation of said seat back frame relative to said seat cushion frame, said reclining device comprising:

at least one holder pivotally mounted on said seat cushion frame such that said holder is disposed forwardly of said pivot point;

at least one rotation rod so arranged that its one end is rotatably connected with said holder while its other end is integrally formed with a male screw member;

at least one female screw member rotatably provided at said seat back frame such that said female screw is disposed above said pivot point, said female screw member being threadedly engaged with said male screw member;

an operation means disposed substantially at a right angle relative to said rotation rod, said operation means being operatively connected with said holder;

at least one orthogonal transmission mechanism provided at said holder, said orthogonal transmission mechanism being adapted to transmit a rotation force produced from said operation means to said rotation rod, thereby allowing said rotation rod to be rotated by said operation means, whereby, when said rotation rod is rotated by said operation means, said female screw member is moved along a longitudinal direction of said male screw member, which causes said seat back frame to incline forwardly and backwardly with respect to said seat cushion frame, and thus, said seat back frame is adjustable its inclination angle relative to said seat cushion frame in a fine adjustment manner, and wherein a top covering is provided for covering said seat cushion frame and said seat back frame in a unitary, integral fashion.

2. The reclining device according to claim 1, wherein a pair of first side frames are each fixed on respective lateral bar sections of said seat cushion frame in an uprightly standing manner, and a pair of second side frames are each fixed on respective lateral bar sections of said seat back frame in a manner projecting forwardly thereof, wherein said holder is provided at said first side frames and wherein said female screw member is provided at said second side frames, so that said rotation rod extends between said first and second side frames.

3. The reclining device according to claim 2, further comprising a first side attachment plate on each of said pair of first side frames of said seat cushion frame and a second side attachment plate on each of said pair of second side frames of said seat back cushion frame, wherein said holder is disposed inwardly of said first side attachment plate, and wherein said female screw member is rotatably secured to said second side attachment plate.

4. The reclining device according to claim 1, wherein said orthogonal transmission mechanism includes a first bevel gear and a second bevel gear in such a manner that they are in a meshed engagement with each other in an orthogonal relationship, wherein said first bevel gear is fixed to said operation means and said second bevel gear is fixed to said rotation rod, and wherein said operation means comprises an operation knob disposed externally of said seat cushion frame.

5. The reclining device according to claim 3, wherein said second side attachment plate comprises a pair of spaced-apart plate members, and wherein said female screw member is rotatably provided between said pair of spaced-apart plate members.

6. The reclining device according to claim 1, wherein said holder is rotatably supported on a substantially inverted-U-shaped bracket fixed on said seat cushion frame.

* * * * *